(12) United States Patent
Penton (10) Patent No.: US 11,700,241 B2
(45) Date of Patent: Jul. 11, 2023

(54) ISOLATED DATA PROCESSING MODULES

(71) Applicant: Geocent, LLC, Metairie, LA (US)

(72) Inventor: Joshua Michael Penton, Mandeville, LA (US)

(73) Assignee: SEVITECH, LLC, Woodbridge, VA (US)

( * ) Notice: Subject to any disclaimer, the term of this patent is extended or adjusted under 35 U.S.C. 154(b) by 490 days.

(21) Appl. No.: 16/721,556

(22) Filed: Dec. 19, 2019

(65) Prior Publication Data

US 2020/0274856 A1    Aug. 27, 2020

Related U.S. Application Data

(60) Provisional application No. 62/814,142, filed on Mar. 5, 2019, provisional application No. 62/811,514, filed on Feb. 27, 2019.

(51) Int. Cl.
*H04L 9/40* (2022.01)
*G06F 16/25* (2019.01)

(52) U.S. Cl.
CPC ........ *H04L 63/0428* (2013.01); *G06F 16/258* (2019.01)

(58) Field of Classification Search
CPC .............................. H04L 63/428; G06F 16/258
USPC ......................................................... 726/26
See application file for complete search history.

(56) References Cited

U.S. PATENT DOCUMENTS

| | | | | |
|---|---|---|---|---|
| 7,690,023 | B2* | 3/2010 | Kato | G06F 21/606 726/1 |
| 8,463,617 | B2* | 6/2013 | Ranous | H04L 9/40 709/224 |
| 8,566,596 | B2* | 10/2013 | Stephenson | G06Q 30/0267 713/168 |
| 8,949,585 | B2* | 2/2015 | Hiltgen | G06F 9/4406 718/1 |
| 8,973,127 | B2* | 3/2015 | Kivinen | H04L 63/164 726/14 |
| 10,216,784 | B1* | 2/2019 | Vadlamani | G06F 16/9024 |
| 2007/0209075 | A1* | 9/2007 | Coffman | H04L 63/14 709/224 |
| 2009/0328225 | A1* | 12/2009 | Chambers | G06F 9/45533 718/1 |
| 2015/0229638 | A1* | 8/2015 | Loo | H04L 67/141 726/11 |
| 2015/0381487 | A1* | 12/2015 | Broz | H04L 63/0471 713/153 |

* cited by examiner

*Primary Examiner* — Amare F Tabor
(74) *Attorney, Agent, or Firm* — Andrew Vicknair (57) ABSTRACT

This disclosure relates to computer systems that isolate data processing modules and methods of operating the same. In one embodiment of a method, a computer system receives a first data processing request for a first data file. The computer system may determine that a first data type of the first data file is supported by an encapsulated data processing module and determine a first communication protocol from a set of communication protocols that can be used to receive the first data file. The computer system can then receive the first data file from the first storage location in accordance with the first communication protocol and the encapsulated data processing module may be executed to convert the first data file in the first data format into second data in a second data format.

28 Claims, 8 Drawing Sheets

ISOLATED DATA PROCESSING MODULES

RELATED APPLICATIONS

This application claims the benefit of U.S. provisional patent application Ser. No. 62/811,514, filed Feb. 27, 2019, the disclosure of which is hereby incorporated herein by reference in its entirety. This application also claims the benefit of U.S. provisional patent application Ser. No. 62/814,142, filed Mar. 5, 2019, the disclosure of which is hereby incorporated herein by reference in its entirety.

STATEMENT REGARDING FEDERALLY SPONSORED RESEARCH OR DEVELOPMENT

This invention was made with government support under 80NSSC18P0310 and 80NSSC18P2647 awarded by the National Aeronautics and Space Administration. The government has certain rights in the invention.

FIELD OF THE DISCLOSURE

This disclosure relates generally to the use of containers to isolate data processing modules.

BACKGROUND

Model Based Systems Engineering (MBSE) and Digital Engineering both refer to a rapidly expanding field that seeks to reduce the time and costs associated with designing and building complex systems by using complex modeling capabilities to develop high fidelity models that represent the complex systems in digital form. The current challenge for MBSE is not a lack of software products to support the modeling process, but the inability of these products to interoperate in a specific way. More specifically, the data output from the software often cannot be provided as a compatible input to the software of the organizational entity responsible for the next stage of the engineering design process. This happens because software designers receive no advantage for integrating their software developer with the software product of the other organizational entity, who may potentially be a competitor.

While data conversion software does exist for converting data formats from different software, most data conversion software is monolithic. This means that a single application has all of the required data conversion capabilities built into its core module along with any sort of additional functionality that is needed to support the data conversions required by the various software products. Thus, any time a change is required or additional functionality needs to be added to the data conversion software, the code for the software requires recompilation, redevelopment, and redeployment. In addition, current legacy solutions do not easily integrate with other software.

Accordingly, what are needed are new techniques for designing data conversion software that does not require recompilation, redevelopment, and redeployment when additions and changes are to be made and that easily integrates with other software.

SUMMARY

This disclosure relates to computer systems that isolate data processing modules and methods of operating the same. In one embodiment of a method, a computer system receives a first data processing request. The first data processing request indicates a first data type and a first storage location of a first data file. Next, the computer system may determine that the first data type of the first data file is supported by an encapsulated data processing module based on the first data processing request. Once it is determined that the first data type of the first data file is supported by an encapsulated data processing module, the computer system may determine a first communication protocol from a set of communication protocols that can be used to receive the first data file. The computer system can then receive the first data file from the first storage location in accordance with the first communication protocol and the encapsulated data processing module may be executed to convert the first data file in the first data format into second data in a second data format.

As explained in further detail below, the above mentioned processes can be performed by containers that include an encapsulated data processing module and a container agent. The container itself isolates the operation of the container agent and the encapsulated data processing module thus isolating from the rest of the data conversion software environment. Accordingly, the container agent and the encapsulated data processing module are isolated and thus any changes to the container agent and the encapsulated data processing module only require changes to the container image that creates the container. Furthermore, this allows for new containers with encapsulated data processing modules to be added without requiring changes to the already existing and encapsulated data processing modules.

The container agent is configured to listen for data conversion request pertinent to its associated encapsulated data processing module and provide the functionality required to feed the data file to be converted to the encapsulated data processing module. The container agent thus makes it easy to integrate the operation of the container into the data conversion environment since the container agent will handle communications to and from the container. Finally, a communication backbone may provide various container agents with data processing requests so that the appropriate container is selected for performing the requested data conversion.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

The computational systems and methods disclosed herein enable data processing modules to be encapsulated while providing integration techniques that allow for the data processing modules to operate with the system environment. In some implementations, containers are used to encapsulate the data processing modules from their environment. A container is software that packages up code, its dependencies, and a runtime operating environment so that an application can run in different environments. Containers may be created when container images are run on a container engine.

To access and to allow access to the encapsulated data processing modules, a container agent is also provided in the container with the encapsulated data processing module. The container agents may handle data processing requests, access input data files from different data repositories, and output data generated by the encapsulated data processing module to external applications. The container agent may thus read the container configuration, determine the type of format that the container agent is responsible for, and handle execution parameters required for accessing the encapsulated data processing module. The container agent thus allows for the encapsulated data processing module to be operationally integrated into its environment.

In some implementations, the container agent is configured to operate with a communication backbone. A communication backbone may be a data management communication system or vice versa. The communication backbone may be used as the central interface module for container agents to communicate with one another and with external software applications. Any type of message bus technology may be used to implement the communication backbone. In some embodiments, the communication backbone is a subscription messaging broker that matches a subscription token to subscribed container agents or that transmit messages to all container agents that are subscribed to a channel. The container agent has the capability of processing those data processing requests directed to the encapsulated data processing module in its container.

Figure 1:
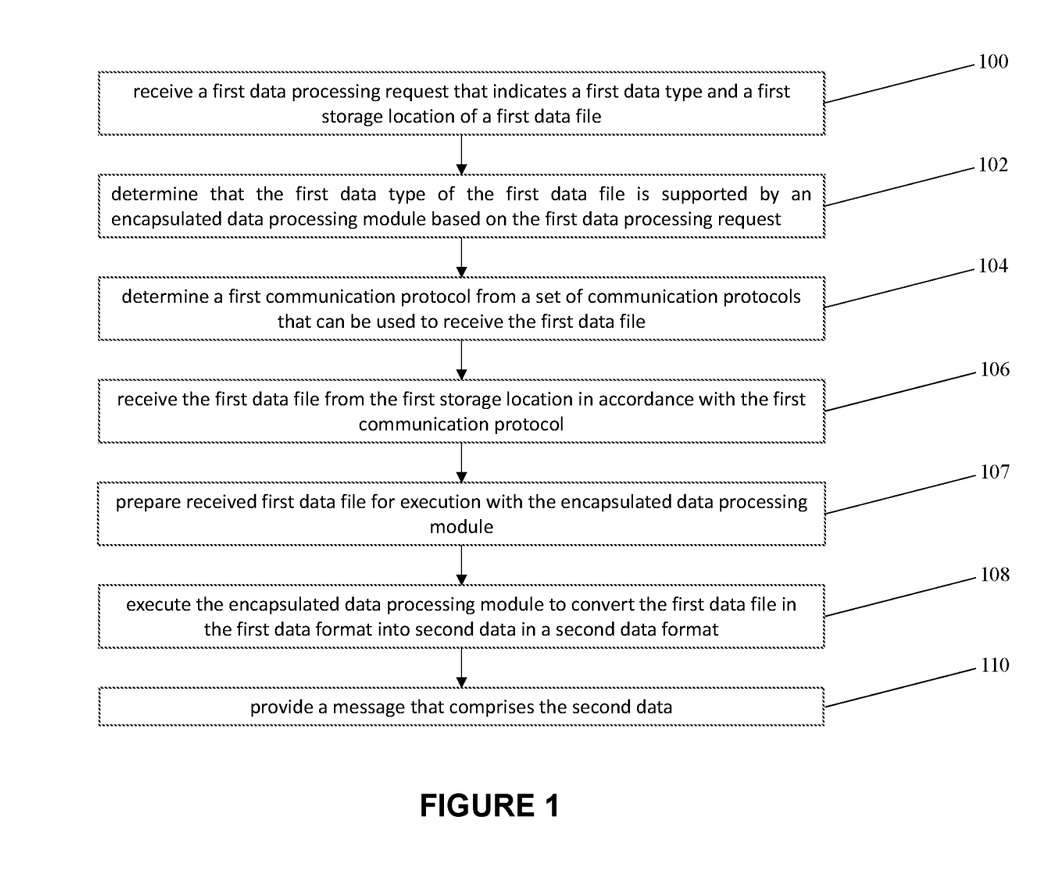
FIG. 1 illustrates one embodiment of a method of converting the data from one data type into data formatted in accordance to another data type.

FIG. 1 illustrates one embodiment of a method of converting the data from one data type into data formatted in accordance to another data type. Different embodiments of these exemplary procedures may be implemented depending on the particular implementation details of a computer system that implements the procedures.

The described systems and techniques may be performed by a computer system that includes a single computer or more than one computer. A computer may be a processor controlled device, such as, by way of example, personal computers, workstations, servers, clients, mini-computers, main-frame computers, laptop computers, smart phones, tablets, a network of one or more individual computers, mobile computers, portable computers, handheld computers, palm top computers, set top boxes for a TV, interactive televisions, interactive kiosks, personal digital assistants, interactive wireless devices, or any combination thereof.

A computer may be a uniprocessor or multiprocessor machine. Accordingly, a computer may include one or more processors and, thus, the aforementioned computer system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, and other suitable hardware configured to perform the various functionality described throughout this disclosure.

Additionally, the computer may include one or more memories. Accordingly, the aforementioned computer systems may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies used to store electronic content such as programs and data.

In particular, the one or more memories may store computer executable instructions that, when executed by the one or more processors, cause the one or more processors to implement the procedures and techniques described herein. The one or more processors may be operably associated with the one or more memories so that the computer executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

The computer may execute an appropriate operating system such as LINUX®, UNIX®, MICROSOFT® WINDOWS®, APPLE® MACOS®, IBM® OS/2®, ANDROID, and PALM® OS, and/or the like. The computer may advantageously be equipped with a network communication device such as a network interface card, a modem, or other network connection device suitable for connecting to one or more networks.

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and/or the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with some of the teachings described herein. In some embodiments, very specific computing machines, with specific functionality, may be required. Similarly, it may prove advantageous to construct a specialized apparatus to perform the method steps described herein by way of dedicated computer systems with hard-wired logic or programs stored in nonvolatile memory, such as, by way of example, read-only memory (ROM).

In some embodiments, features of the computer systems can be implemented primarily in hardware using, for example, hardware components such as application specific integrated circuits (ASICs) or field-programmable gated arrays (FPGAs). Implementation of the hardware circuitry will be apparent to persons skilled in the relevant art(s). In yet another embodiment, features of the computer systems can be implemented using a combination of both general-purpose hardware and software Furthermore, the order in which the procedures are presented is not intended to imply a required sequence for the procedures. Rather, the procedures may be implemented in a different sequence and/or some or all of the procedures may be implemented simultaneously.

In one implementation, the computer system performs the procedures described in FIG. 1 by using a software architecture. The software architecture includes a communication backbone and one or more containers. The communication backbone is an application that serves both as the application programming interface to external applications and as an intercommunication module for the various containers. In some implementations, the communication backbone publishes data processing requests to a set of container agents that are provided in the containers. This set of container agents may all be subscribed through some type of permissioned communication service to receive the data processing requests. For example, the container agents may subscribe to shared notification tokens or channels defined by the communication backbone. Data processing requests can be tagged with specific tokens or designated to specific channels. Container agents may be granted a subscription to a token or channel and any data processing request that is published is received by all container agents subscribed to that tagged token or channel. Each of the data processing requests may include a data type and a storage location of the data file.

The containers also include an encapsulated data processing module, which may be an executable or a library that performs the functionality for performing data processing, such as data conversion from one data format into the other. In one embodiment, the containers with the encapsulated data processing module provide isolated execution environments that permit conversions from specific data formats. This permits for new containers with new data conversion functionality to be easily added to the system without requiring mass changes or compilations. Furthermore, the functionality of a container can easily be changed simply by modifying the code in the container.

The particular procedures discussed in FIG. 1 relate to the procedures performed by the components of the container in order to provide a data conversion. Prior to the procedures described in FIG. 1, a base virtual execution environment may be defined for a containerization technology. Any type of containerization technology may be used. For example, if Docker is used as the containerization technology, a configuration file may be set up that defines the runtime operating system, system packages, and environment variables for the virtualized execution environment. The virtualized execution environment will include the containers with the container agents (e.g., an executable data management and lifecycle execution agent) and the encapsulated data processing module (e.g., a targeted executable or library to process data formats). The configuration file may specify parameters for the container agent that define which data formats the agent can process, define how the agent will execute the targeted executable or library, and define how the agent will communicate with the communication backbone.

Referring again to FIG. 1, the computer system may initially receive a first data processing request that indicates a first data type and a first storage location of a first data file (procedure 100). If the container agent of the container is a member of a channel, this may be performed by the container agent in the container when the communication backbone publishes the data processing request within the channel that the container agent is subscribed to. As explained in further detail below, the communication backbone may initially receive the first data processing request from an external application that generates, stores, or otherwise is associated with the first data file. The communication backbone may then determine that the first data processing requests is from an entity that is associated with a specific channel. The communication backbone may then publish the first data processing requests to all of the containers that are members of the channel.

It should be noted that each data file described in FIG. 1 may be associated with various data types as different portions of the file data in a data file may require different encapsulated data processing modules in different containers to perform conversions. In this case, the container agent of each of the relevant containers will arrange for its associated encapsulated data processing module to receive the appropriate portion of the file data from the data file.

In one implementation, the container agent reads the container configuration in order to determine specifically the network locations of the communication backbone that the container agent is going to be subscribing to, the type of format for which the container is responsible, as well as execution parameters required for accessing the data processing module for which it is integrated. In one implementation, the container agent reads configuration information from a file within the virtual execution environment. From the configuration information in the configuration file, the container agent can determine which data type an container agent can process, determine runtime information connection information for a communication backbone, and connect to a data management communication system to receive data processing requests.

The computer system may then determine that the first data type of the first data file is supported by an encapsulated data processing module based on the first data processing request (procedure 102). In one implementation, the container agent subscribes to the appropriate channel as part of the configuration process so that the communication backbone provides the container agent data processing request through the subscribed channel. Thus, when the communication backbone publishes the first data processing requests, each of the container agents may determine whether the data processing module contained in their respective container provides a data conversion for that data type based on the first data processing request. For example, the first data processing request may include a data field that is a data type indicator that is set to a value that indicates the first data type of the first data file. Each of the container agents can then determine whether the value of the data type indicator matches the value of the data type for data files that can be utilized as an input to their encapsulated data processing module. Those containers with encapsulated data processing modules that are functional with the data type will ignore the request. However, the container agent in the container with the encapsulated data processing module for the first data type of the first data file will determine that the value of the data type indicator matches the value of the data type for data files that can be utilized as an input to their encapsulated data processing module.

The computer system may also determine a first communication protocol from a set of communication protocols that can be used to receive the first data file (procedure 104). For example, the container agent may determine the most appropriate communication protocol from the set of available communication protocols for fetching the first data file based on the storage location of the first data file as indicated in the first data processing request. In one embodiment, the container agent may utilize polyglot data transport functionality to enable data retrieval from a wide variety of data sources including but not limited to: HTTP/HTTPS, FTP, SFTP, SMB, NFS, IPFS and XMODEM/ZMODEM.

The computer system may then receive the first data file from the first storage location in accordance with the first communication protocol (procedure 106). In one example, the container agent may fetch the first data file from the indicated storage location in the first data file by engaging in the procedures required by the first communication protocol to receive the first data file. The communication backbone may serve as an intermediary when receiving the first data file from an external data source.

The computer system may then prepare the received first data file for execution with the encapsulated data processing module (procedure 107). In one example, the container agent may create a copy of the received first data file at a location within the container that is accessible by the encapsulated data processing module.

The computer system may then execute the encapsulated data processing module to convert the first data file in the first data format into second data in a second data format (procedure 108). For example, the container agent may provide the first data file as input to the encapsulated data processing module associated with its container. The container agent may utilize execution parameters obtained during the configuration process and execute the encapsulated data processing module using the execution parameters and providing the first data file as an input to the encapsulated data processing module. The encapsulated data processing module may then perform a translation of all the file data in the first data file or part of the file data in the first data file to create the second data in the second data format. Again, in some circumstances, the encapsulated data processing modules of various containers may be needed to convert different parts of the file data into data in different file formats.

The computer system may provide a message that comprises the second data (procedure 110). For instance, the container agent may receive the second data as an output from the encapsulated data processing module. In some implementations, the container agent may then generate a message that includes the second data as the message payload and transmit the message to the communication backbone. In one example, the message may indicate the data type and the storage location of the second data. The communication backbone may read the message and then publish the message with the second data in a channel associated with the data type of the second data based on the message or in a project specific channel. Alternatively, the communication backbone may provide the second data to another container and/or provide the second data to an external application.

Figure 2:
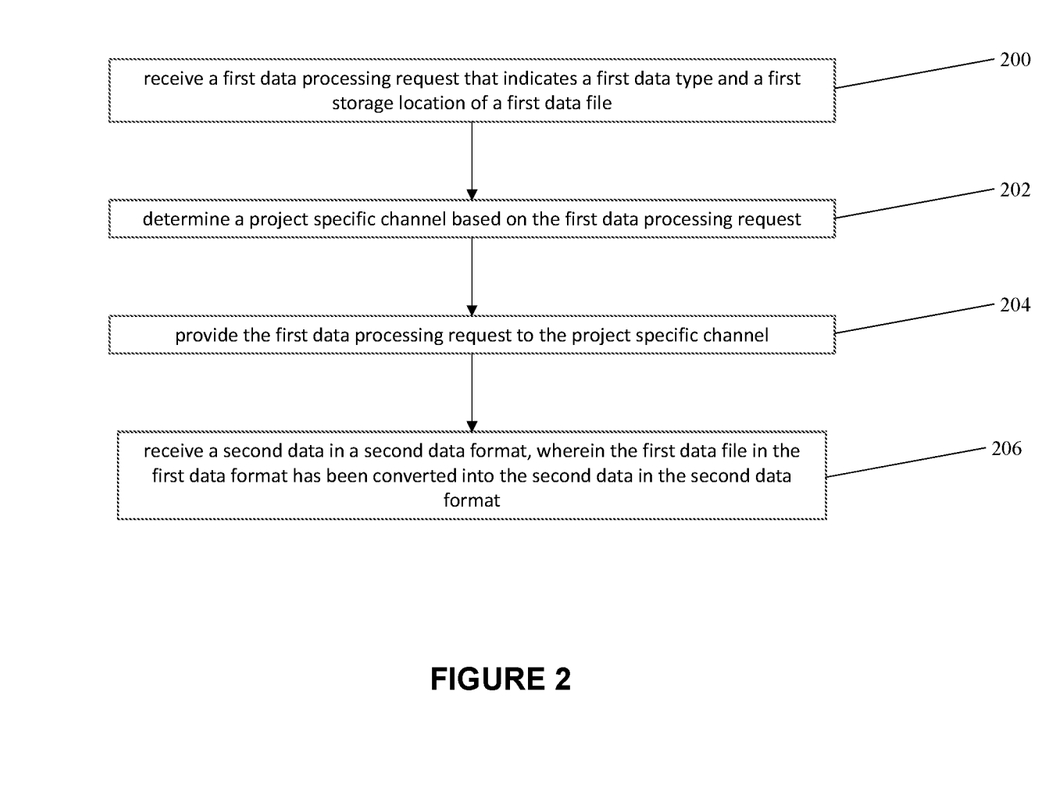
FIG. 2 illustrates one embodiment of a method of communicating data to be converted and converted data to and from a data processing module that performs the conversions.

FIG. 2 illustrates one embodiment of a method of communicating data to be converted and converted data to and from a data processing module that performs the conversions. Different embodiments of these exemplary procedures may be implemented depending on the particular implementation details of a computer system that implements the procedures. Furthermore, the order in which the procedures are presented is not intended to imply a required sequence for the procedures. Rather, the procedures may be implemented in a different sequence and/or some or all of the procedures may be implemented simultaneously.

The described systems and techniques may be performed by the computer system, as described above. In one implementation, the computer system performs the procedures described in FIG. 2 by using a software architecture. More specifically, the procedures described in FIG. 2 may be performed by the communication backbone that communicates with the containers, where the containers as described with respect to FIG. 1 perform the data conversions.

As shown in FIG. 2, the computer system may receive a first data processing request that indicates a first data type and a first storage location of a first data file (procedure 200) or that requests information from the first data file as input. In one implementation, the communication backbone may receive the first data processing request from an external application, such as an application that generates the first data file that is to be converted. The computer system may then determine a project specific channel based on the first data processing request (procedure 202). For example, the communication backbone may administer various project specific channels, each having different members. The communication backbone may determine that all data processing requests that are a particular data type and/or for a particular storage location are for a particular project specific channel. Additionally or alternatively, the data processing requests may further identify a computer system that runs the external application and/or that has the first storage location that stores the first data file. In this case, the communication backbone may determine that data processing requests are from an external computer system that runs the external application or from the external computer system that requires the data conversion.

The computer system may then provide the first data processing request to the project specific channel (procedure 204). In one example, whatever particular project specific channel was selected based on the first data processing request, the communication backbone may then publish the first data processing request in that channel. As described with respect to FIG. 1, the first data processing request will be transmitted to the containers that are members of that channel. The container agents will determine if the first data processing request is for the encapsulated data processing module associated with its container. The appropriate agent in the appropriate container will then cause its encapsulated data processing module to perform the appropriate data conversion and output the second data, as described above.

The computer system may then receive second data in a second data format, wherein the first data file in the first data format has been converted into the second data in the second data format (procedure 206). In one implementation, the container agent will then transmit the second data to the communication backbone after the encapsulated data processing module converts the first data file into the second data. The second data may be sent as the payload of the message (as described above with respect to procedure 110) to the communication backbone. Upon receiving the second data, the communication backbone may transmit the second data to an external application and/or may publish the second data in the project specific channel so that another container performs a data processing function with the second data. Additionally or alternatively, the communication backbone may publish the second data in another project specific channel based on the message. For example, the message may indicate the second data format of the second data, the storage location of the second data, and/or the computer system that stores the second data. The communication backbone may publish the second data in another project specific channel selected based on this information in the message.

In one implementation, the process described above in FIG. 2 is utilized to convert engineering model information saved in files in different data formats into a common 3D data format. Various containers may be used with encapsulated data processing modules for each of the different data formats. In this manner, all the engineering model information can be viewed with a common 3-D visualizer.

In another implementation, a container is provided for converting a CAD drawing into input for a computer physics model of a product. The container may include an encapsulated data processing module that extracts geometric information from the CAD drawing so that it can be utilized by the computer physics model. These and other implementation would apparent to one of ordinary skill in the art in light of this disclosure.

Figure 3:
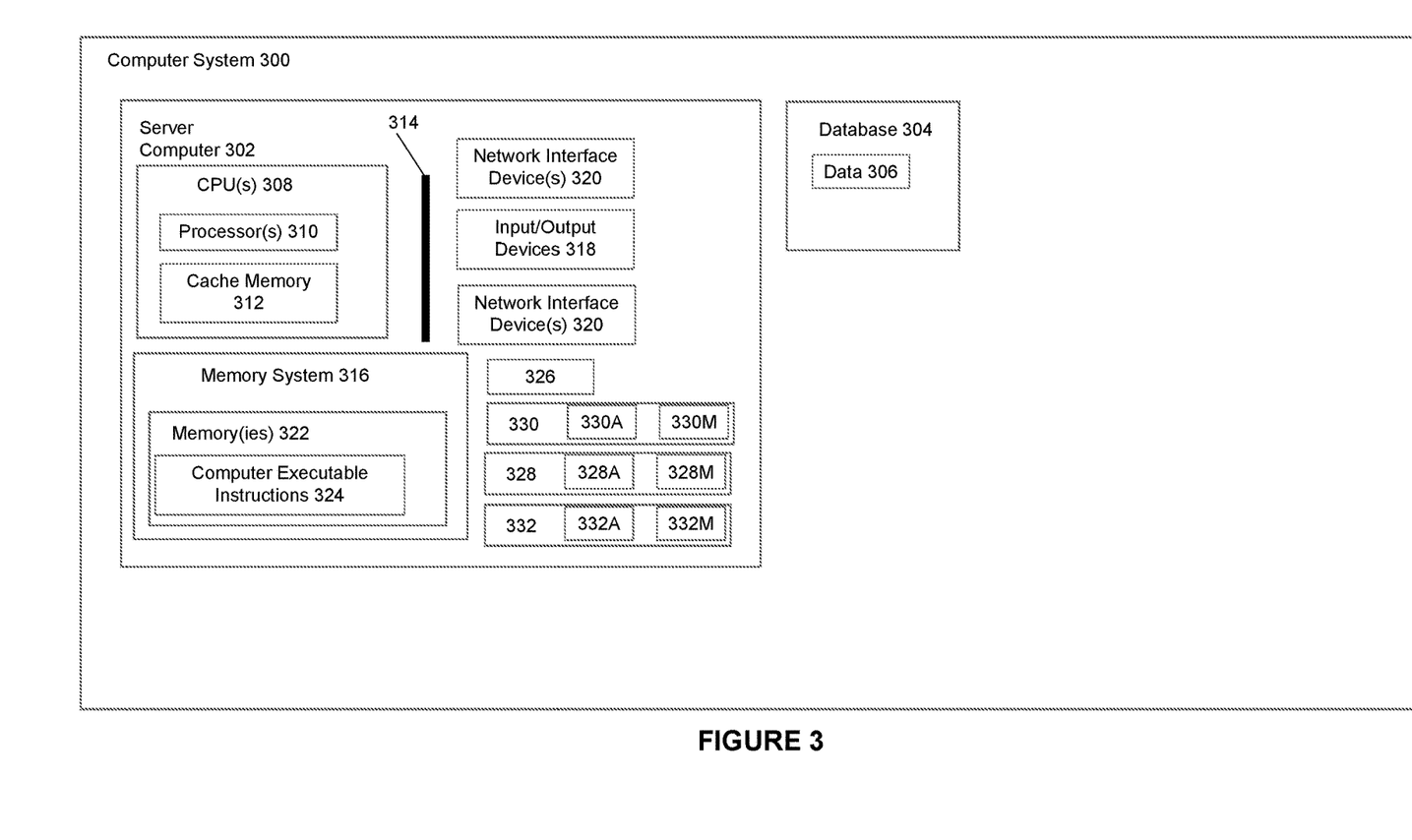
FIG. 3 illustrates one embodiment of a computer system that may be utilized to perform the procedures in FIG. 1 and FIG. 2.

FIG. 3 illustrates one embodiment of a computer system 300 configured to operate as described above. The computer system 300 in FIG. 3 is a server computer 302, which is configured to perform the operations described above with respect to both FIG. 1 and FIG. 2, as explained in further detail below. In this embodiment, the computer system 300 also includes a database 304, which is operably associated with the server computer 302. The database 304 is configured to store different sets of data 306, which may include data files for conversion and the converted data from those data files. The data 306 may also include data processing requests and other information associated with performing data conversions.

The server computer 302 includes one or more central processing units (CPUs) 308, each including one or more processors 310. The CPU(s) 308 may be a master device. The CPU(s) 308 may also have cache memory 312 (which is a type of memory) coupled to the processor(s) 310 for rapid access to temporarily stored computer executable instructions and register values. The CPU(s) 308 are coupled to a system bus 314 where the system bus 314 is configured to intercouple master and slave devices included in the server computer 302. The system bus 314 may be a bus interconnect. As is well known, the CPU(s) 308 communicate with these other devices by exchanging address, control, computer executable instructions and other information over the system bus 314. Furthermore, the server computer 302 includes a memory system 316, one or more input/output devices 318, and one or more network interface device(s) 320.

The input/output device(s) 318 can include any type of input/output device including keyboards, displays, touchscreens, switches, microphones, speakers, and/or the like. The network interface device(s) 320 can be any device configured to allow data exchange between the server computer 302 and external computers, and between the server computer 302 and the databases 304. For example, the server computer 302, and the databases 304 may all be part of a computer network, including but not limited to a wired or wireless network, private or public network, a local area network (LAN), a wide local area network (WLAN), and/or the Internet. The network interface device(s) 320 can be configured to support any type of communication protocol desired used by different types of computer networks.

The memory system 316 can include one or more memories 322 that are configured to store computer executable instructions 324. In this embodiment, the computer executable instructions 324 may be loaded through the system bus 314 to the cache memory(ies) 312 of the CPU(s) 308. In this manner, the processor(s) 310 of the CPU(s) 308 are configured to execute the computer executable instructions 324. As explained in further detail below, the computer executable instructions 324 cause the processor(s) 316 to perform the procedures described above in FIG. 1 and FIG. 2.

In this embodiment, the computer executable instructions 324 cause the processors 324 to implement software entities that include both the communication backbone 326 and various containers 328, 330, 332. Each of the containers 328, 330, 332 includes a container agent 328A, 330A, 332A and an encapsulated data processing module 328M, 330M, 332M. The communication backbone 326 is implemented to perform embodiments of the procedures described above with respect to FIG. 2. Each of the containers 328, 330, 332 are configured to perform the procedures described above with respect to FIG. 1 when their container agent 328A, 330A, 332A is provided a data processing request that is for a data file with a data type that can be provided as input to their associated encapsulated data processing module 328M, 330M, 332M. In this implementation, the procedures are implemented entirely using software. However, in other implementations, the procedures may be implemented entirely by specially designed hardware. In still other implementations, the procedures are implemented in some combination of software and specially designed hardware.

Figure 4:
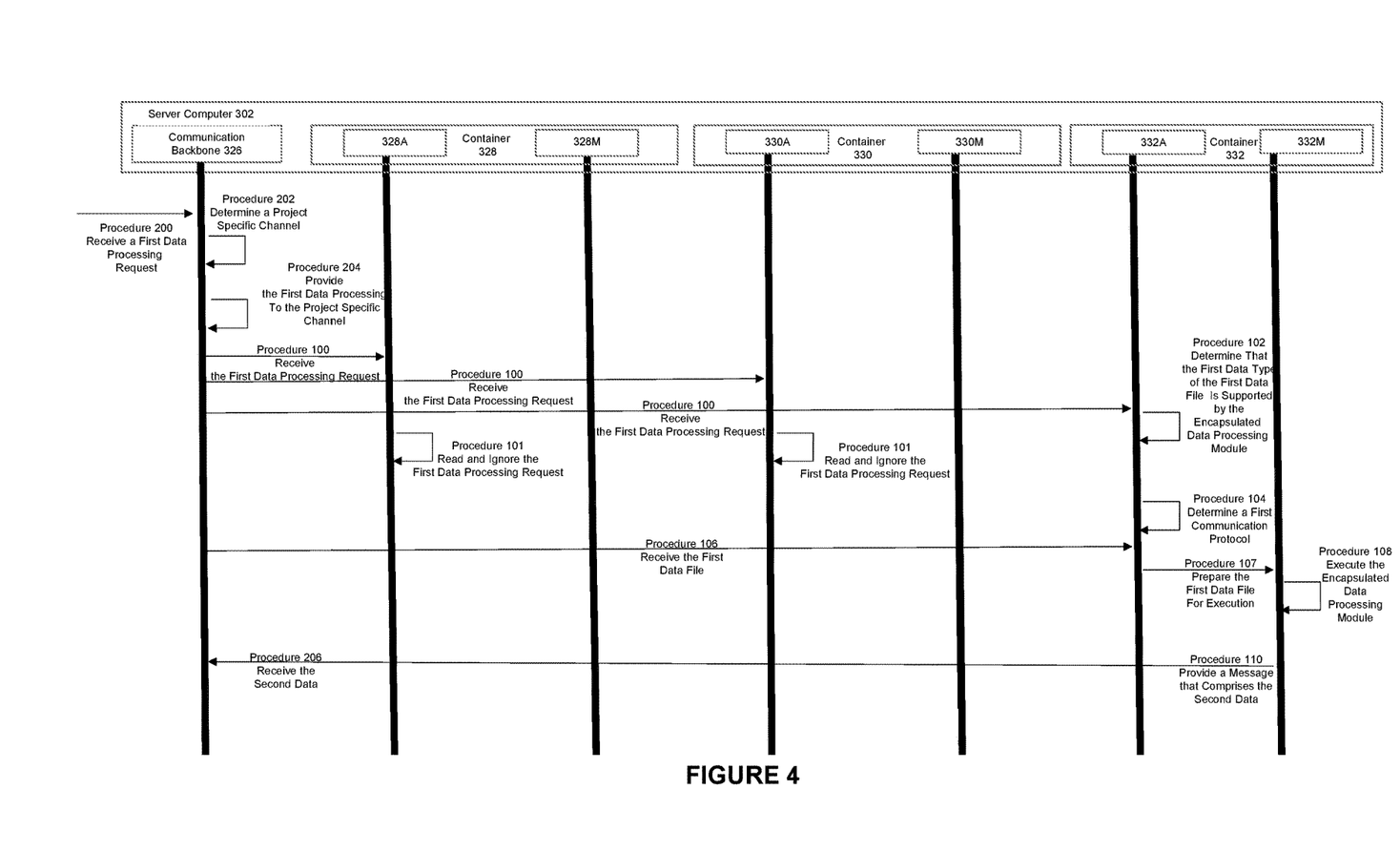
FIG. 4 is embodiments of the procedures performed by the computer system shown in FIG. 3.

FIG. 4 illustrates one embodiment of the procedures described above with respect to FIG. 1 and one embodiment of the procedures described above with respect to FIG. 2, as performed by the computer system 300 shown in FIG. 3. In this embodiment, the server computer 302 may receive a first data processing request that indicates a first data type and a first storage location of a first data file (procedure 200). This data processing request may come from an external computer system, such as for example, the computer system that stores or generates the first data file. With respect to the software components, the communication backbone 326 receives the first data processing request from an external application, such as an application that generates the first data file that is to be converted. The communication backbone 326 may then determine a project specific channel based on the first data processing request (procedure 202). For example, the communication backbone 326 may administer various project specific channels, each having different members. The communication backbone 326 may determine that all data processing requests that are a particular data type and/or for a particular storage location are for a particular project specific channel. Additionally or alternatively, the data processing requests may further identify a computer system that runs the external application and/or that has the first storage location that stores the first data file. In this case, the communication backbone 326 may determine that data processing requests are from the external computer system that runs the external application or from the external computer system that requires the data conversion.

In this example, the container agent 328A, 330A, 332A of each of the containers 328, 330, 332 are all presumed to be members of the same project specific channel. Furthermore, it is presumed that the communication backbone 326 has determined that this project specific channel has been selected based on the information in the first data processing request.

The communication backbone 326 may then provide the first data processing request to the project specific channel (procedure 204). In this implementation, the communication backbone 326 publishes the first data processing request to the project specific channel and thus transmits the first data processing request to each of the container agents 328A, 330A, 332A, which are members of the selected project specific channel. As such, each of the container agents 328A, 330A, 332A may initially receive a first data processing request that indicates a first data type and a first storage location of a first data file (procedure 100). In this example, it is presumed that the encapsulated data processing module 332M provides a conversion for the first data type of the data processing request, while the encapsulated data processing modules 328M, 330M do not provide conversions for the first data type of the request.

Next, the container agent 328A, the container agent 330A, and the container agent 332A receive the first data processing request that indicates the first data type and the first storage location of the first data file or a computer system that requires information from the first data file as input (procedure 100). Since the encapsulated data processing modules 328M, 330M do not provide conversions for the first data type of the data processing request, both the container agents 328A, 330A will read and then ignore the first data processing request (procedure 101). However, since the encapsulated data processing module 332M does provide conversions for the first data type of the data processing request, the container agent 332A determines that the first data type of the first data file is supported by the encapsulated data processing module 332M based on the first data processing request (procedure 102).

In this case, the container agent 332A also determines a first communication protocol from a set of communication protocols that can be used to receive the first data file (procedure 104). For example, the container agent 332A may determine the most appropriate communication protocol from the set of available communication protocols for fetching the first data file based on the storage location of the first data file as indicated in the first data processing request. In one embodiment, the container agent 332A utilizes polyglot data transport functionality to enable data retrieval from a wide variety of data sources including but not limited to: HTTP/HTTPS, FTP, SFTP, SMB, NFS, IPFS and XMODEM/ZMODEM. This may also depend on the operational characteristics of the external computer system that is storing the first data file.

The server computer 302 may then receive the first data file from the first storage location in accordance with the first communication protocol (procedure 106). The server computer 302 then provides the first data file to the container agent 332A. The communication backbone 326 serves as an intermediary when receiving the first data file from an external data source. More specifically, the communication backbone 326 may provide an interface to the external computer system in order for the container agent 332A to receive the first data file. The container agent 332A may then perform the appropriate procedures such that the first data file is provided as an input to the encapsulated data processing module 332M.

The server computer 302 may then prepare the received first data file for execution with the encapsulated data processing module 332M (procedure 107). For example, the container agent 332A may then create a copy of the received first data file at a location within the container 332 that is accessible by the encapsulated data processing module 332M.

The server computer 302 may then execute the encapsulated data processing module 332M in the container 332 to convert the first data file in the first data format into second data in a second data format (procedure 108). The encapsulated data processing module 332M may then provide the second data to the container agent 332A. The container agent 332A may then provide a message that comprises the second data (procedure 110). More specifically, the container agent 332A may transmit the message with the second data to the communication backbone 326.

The communication backbone 326 may then receive the second data in the second data format (procedure 206). Upon receiving the second data, the communication backbone 326 may transmit the second data to an external application and/or may publish the second data in the project specific channel so that another container performs a data processing function with the second data. Additionally or alternatively, the communication backbone may publish the second data in another project specific channel based on the message. For example, the message may indicate the second data format of the second data, the storage location of the second data, and/or the computer system that stores the second data. The communication backbone 326 may publish the second data in another project specific channel selected based on this information in the message.

Figure 5:
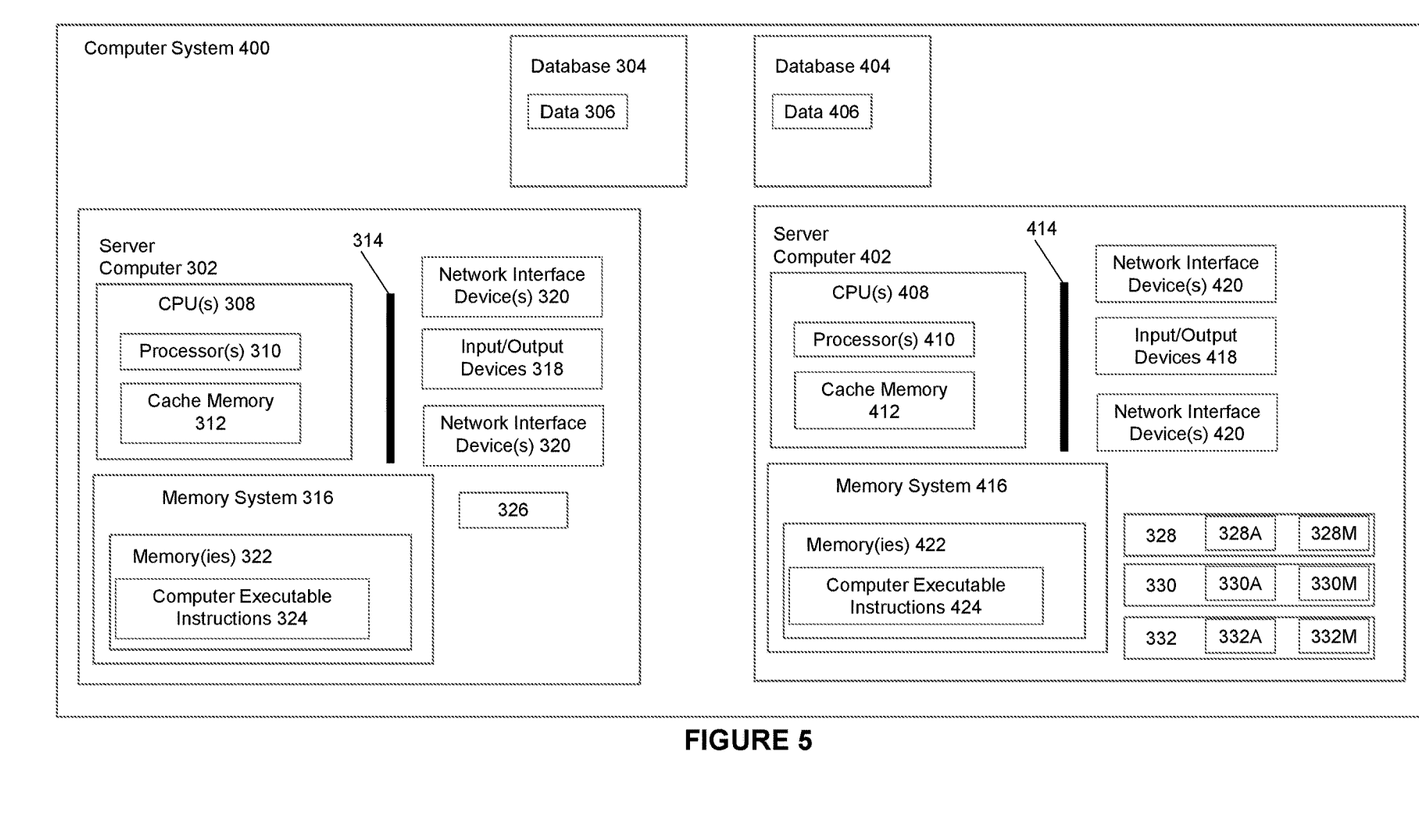
FIG. 5 illustrates another embodiment of a computer system that may be utilized to perform the procedures in FIG. 1 and FIG. 2.

FIG. 5 illustrates another embodiment of a computer system 400 configured to operate as described above. The computer system 400 in FIG. 5 includes the server computer 302 described above with respect to FIG. 3 and a server computer 402. However, in this embodiment, the server computer 302 performs the procedures described above with respect to FIG. 1 and the server computer 402 performs the procedures described above with respect to FIG. 2. In this embodiment, the computer system 400 also includes the database 304 and a database 404. The database 404 is operably associated with the server computer 402. The database 404 is configured to store different sets of data 406, which may include data files for conversion and the converted data from those data files. The data 406 may also include data processing requests and other information associated with performing data conversions.

The server computer 402 includes one or more central processing units (CPUs) 408, each including one or more processors 410. The CPU(s) 408 may be a master device. The CPU(s) 408 may also have cache memory 412 coupled to the processor(s) 410 for rapid access to temporarily stored computer executable instructions and register values. The CPU(s) 408 are coupled to a system bus 414 where the system bus 414 is configured to intercouple master and slave devices included in the server computer 402. The system bus 414 may be a bus interconnect. As is well known, the CPU(s) 408 communicate with these other devices by exchanging address, control, computer executable instructions and other information over the system bus 414. Furthermore, the server computer 402 includes a memory system 416, one or more input/output devices 418, and one or more network interface device(s) 420.

The input/output device(s) 418 can include any type of input/output device including keyboards, displays, touchscreens, switches, microphones, speakers, and/or the like. The network interface device(s) 420 can be any device configured to allow data exchange between the server computer 402 and external computers, and between the server computer 402 and the databases 404. For example, the client computers 402, the server computer 402, and the databases 404 may all be part of a computer network, including but not limited to a wired or wireless network, private or public network, a local area network (LAN), a wide local area network (WLAN), and/or the Internet. The network interface device(s) 420 can be configured to support any type of communication protocol desired used by different types of computer networks.

The memory system 416 can include one or more memories 422 that are configured to store computer executable instructions 424. In this embodiment, the computer executable instructions 424 may be loaded through the system bus 414 to the cache memory(ies) 412 of the CPU(s) 408. In this manner, the processor(s) 410 of the CPU(s) 408 are configured to execute the computer executable instructions 424. As explained in further detail below, the computer executable instructions 424 cause the processor(s) 416 to perform the procedures described above in FIG. 1. Also, in this case, the computer executable instructions 324 of the server computer 302 cause the processor(s) 316 to perform the procedures described above with respect to FIG. 2.

Figure 6:
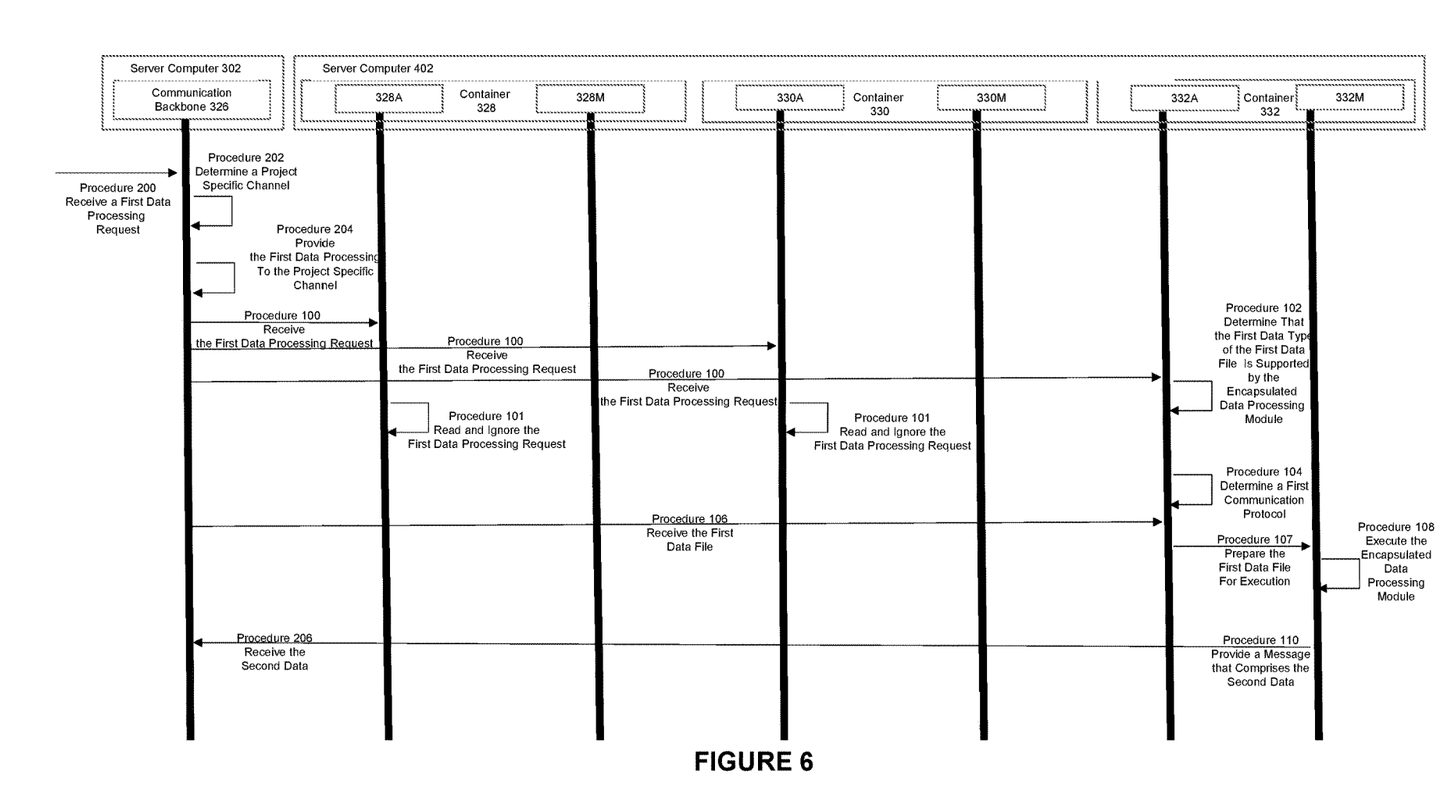
FIG. 6 is embodiments of the procedures performed by the computer system shown in FIG. 5.

FIG. 6 illustrates one embodiment of the procedures described above with respect to FIG. 1 and one embodiment of the procedures described above with respect to FIG. 2, as performed by the computer system 400 shown in FIG. 3. In this embodiment, the server computer 302 may receive a first data processing request that indicates a first data type and a first storage location of a first data file (procedure 200). This data processing request may come from an external computer system, such as for example, the computer system that generates the first data file or an external computer that requires the data conversion. With respect to the software components, the communication backbone 326 receives the first data processing request from an external application, such as an application that generates the first data file that is to be converted. The communication backbone 326 may then determine a project specific channel based on the first data processing request (procedure 202). For example, the communication backbone 326 may administer various project specific channels, each having different members. The communication backbone 326 may determine that all data processing requests that are a particular data type and/or for a particular storage location are for a particular project specific channel. Additionally or alternatively, the data processing requests may further identify a computer system that runs the external application and/or that has the first storage location that stores the first data file. In this case, the communication backbone 326 may determine that data processing requests are from the external computer system that runs the external application or from the external computer system that requires the data conversion.

The communication backbone 326 may then provide the first data processing request to the project specific channel (procedure 204). In this example, the computer executable instruction 424 cause the processor(s) 416 to implement the containers 328, 330, 332, as shown in FIG. 5. Also, the container agent 328A, 330A, 332A of each of the containers 328, 330, 332 are all presumed to be members of the same project specific channel. Furthermore, it is presumed that the communication backbone 326 has determined that this project specific channel has been selected based on the information in the first data processing request. In this implementation, the communication backbone 326 publishes the first data processing request to the project specific channel and thus transmits the first data processing request to the container agents 328A, 330A, 332A in the server computer 402 because the container agents 328A, 330A, 332A are each members of the selected project specific channel.

As such, each of the container agents 328A, 330A, 332A in the server computer 402 may initially receive a first data processing request that indicates a first data type and a first storage location of a first data file (procedure 100). In this example, it is presumed that the encapsulated data processing module 332M provides a conversion for the first data type of the data processing request, while the encapsulated data processing modules 328M, 330M do not provide conversions for the first data type of the data processing request.

Since the encapsulated data processing modules 328M, 330M do not provide conversions for the first data type of the data processing request, both the container agents 328A, 330A will read and then ignore the first data processing request (procedure 101). However, since the encapsulated data processing module 332M does provide conversions for the first data type of the data processing request, the container agent 332A determines that the first data type of the first data file is supported by the encapsulated data processing module 332M based on the first data processing request (procedure 102).

In this case, the container agent 332A also determines a first communication protocol from a set of communication protocols that can be used to receive the first data file (procedure 104). For example, the container agent 332A may determine the most appropriate communication protocol from the set of available communication protocols for fetching the first data file based on the storage location of the first data file as indicated in the first data processing request. In one embodiment, the container agent 332A utilizes polyglot data transport functionality to enable data retrieval from a wide variety of data sources including but not limited to: HTTP/HTTPS, FTP, SFTP, SMB, NFS, IPFS and XMODEM/ZMODEM. This may also depend on the operational characteristics of the external computer system that is storing the first data file.

The server computer 402 may then receive the first data file from the first storage location in accordance with the first communication protocol (procedure 106). The server computer 402 then provides the first data file to the container agent 332A. The communication backbone 326 serves as an intermediary when receiving the first data file from an external data source. More specifically, the communication backbone 326 may provide an interface to the external computer system in order for the container agent 332A to receive the first data file. The container agent 332A may then perform the appropriate procedures such that the first data file is provided as an input to the encapsulated data processing module 332M.

The server computer 402 may then prepare the received first data file for execution with the encapsulated data processing module 332M (procedure 107). For example, the container agent 332A may then create a copy of the received first data file at a location within the container 332 that is accessible by the encapsulated data processing module 332M.

The server computer 402 may then execute the encapsulated data processing module 332M in the container 332 to convert the first data file in the first data format into second data in a second data format (procedure 108). The encapsulated data processing module 332M may then provide the second data to the container agent 332A. The container agent 332A may then provide a message that comprises the second data (procedure 110). More specifically, the container agent 332A may transmit the message with the second data to the communication backbone 326.

The communication backbone 326 may then receive the second data in the second data format (procedure 206). Upon receiving the second data, the communication backbone 326 may transmit the second data to an external application and/or may publish the second data in the project specific channel so that another container performs a data processing function with the second data. Additionally or alternatively, the communication backbone may publish the second data in another project specific channel based on the message. For example, the message may indicate the second data format of the second data, the storage location of the second data, and/or the computer system that stores the second data. The communication backbone 326 may publish the second data in another project specific channel selected based on this information in the message.

Figure 7:
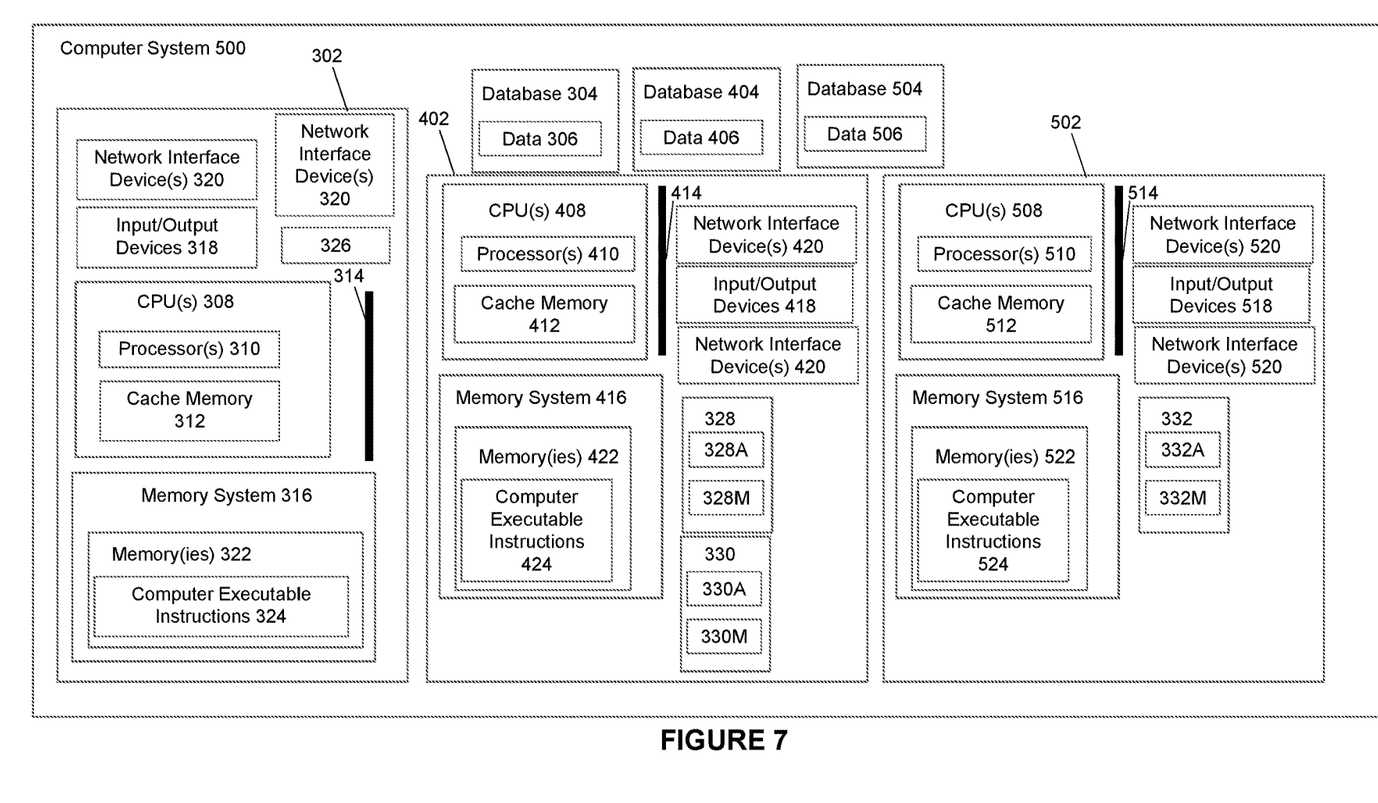
FIG. 7 illustrates another embodiment of a computer system that may be utilized to perform the procedures in FIG. 1 and FIG. 2.

FIG. 7 illustrates another embodiment of a computer system 500 configured to operate as described above. The computer system 500 in FIG. 7 includes the server computer 302 described above with respect to FIG. 3, the server computer 402 described above with respect to FIG. 5 and a server computer 502. In this embodiment, the server computer 302 performs the procedures described above with respect to FIG. 1 and the server computer 502 performs the procedures described above with respect to FIG. 2. The server computer 402 is involved in the process as explained below (i.e., the server computer 502 has the container 332 while the server computer 402 only has containers 328, 330, which have encapsulated data processing modules 328M, 330M that are presumed not to perform conversions on the first data type). In this embodiment, the computer system 500 also includes the database 304, the database 404, and a database 504. The database 504 is operably associated with the server computer 502. The database 504 is configured to store different sets of data 506, which may include data files for conversion and the converted data from those data files. The data 506 may also include data processing requests and other information associated with performing data conversions.

The server computer 502 includes one or more central processing units (CPUs) 508, each including one or more processors 510. The CPU(s) 508 may be a master device. The CPU(s) 508 may also have cache memory 512 (which is a type of memory) coupled to the processor(s) 510 for rapid access to temporarily stored computer executable instructions and register values. The CPU(s) 508 are coupled to a system bus 514 where the system bus 514 is configured to intercouple master and slave devices included in the server computer 502. The system bus 514 may be a bus interconnect. As is well known, the CPU(s) 508 communicate with these other devices by exchanging address, control, computer executable instructions and other information over the system bus 514. Furthermore, the server computer 502 includes a memory system 516, one or more input/output devices 518, and one or more network interface device(s) 520.

The input/output device(s) 518 can include any type of input/output device including keyboards, displays, touchscreens, switches, microphones, speakers, and/or the like. The network interface device(s) 520 can be any device configured to allow data exchange between the server computer 502 and external computers, and between the server computer 502 and the databases 504. For example, the client computers 502, the server computer 502, and the databases 504 may all be part of a computer network, including but not limited to a wired or wireless network, private or public network, a local area network (LAN), a wide local area network (WLAN), and/or the Internet. The network interface device(s) 520 can be configured to support any type of communication protocol desired used by different types of computer networks.

The memory system 516 can include one or more memories 522 that are configured to store computer executable instructions 524. In this embodiment, the computer executable instructions 524 may be loaded through the system bus 514 to the cache memory(ies) 512 of the CPU(s) 508. In this manner, the processor(s) 510 of the CPU(s) 508 are configured to execute the computer executable instructions 524. As explained in further detail below, the computer executable instructions 524 cause the processor(s) 516 to perform the procedures described above in FIG. 1. Also, in this case, the computer executable instructions 324 of the server computer 302 cause the processor(s) 316 to perform the procedures described above with respect to FIG. 2. The server computer 402 implements the containers 328, 330, while the server computer 502 implements the container 332.

Figure 8:
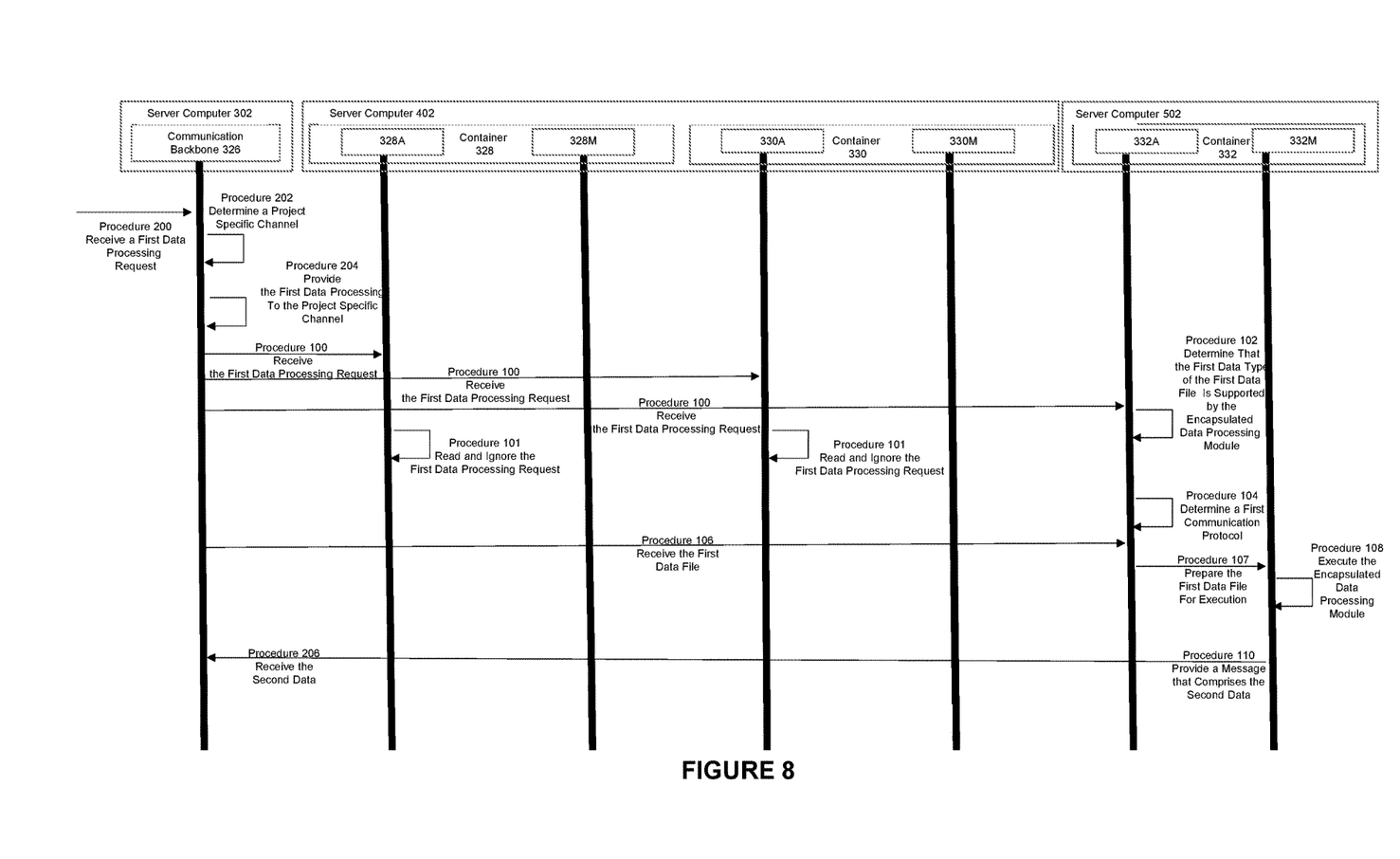
FIG. 8 is embodiments of the procedures performed by the computer system shown in FIG. 7.

FIG. 8 illustrates one embodiment of the procedures described above with respect to FIG. 1 and one embodiment of the procedures described above with respect to FIG. 2, as performed by the computer system 500 shown in FIG. 3. In this embodiment, the server computer 302 may receive a first data processing request that indicates a first data type and a first storage location of a first data file (procedure 200). This data processing request may come from an external computer system, such as for example, the computer system generates the first data file or that is requesting the data conversion. With respect to the software components, the communication backbone 326 receives the first data processing request from an external application, such as an application that generates the first data file that is to be converted. The communication backbone 326 may then determine a project specific channel based on the first data processing request (procedure 202). For example, the communication backbone 326 may administer various project specific channels, each having different members. The communication backbone 326 may determine that all data processing requests that are a particular data type and/or for a particular storage location are for a particular project specific channel. Additionally or alternatively, the data processing requests may further identify a computer system that runs the external application and/or that has the first storage location that stores the first data file. In this case, the communication backbone 326 may determine that data processing requests are from the external computer system that runs the external application or from the external computer system that requires the data conversion.

The communication backbone 326 may then provide the first data processing request to the project specific channel (procedure 204). In this example, the computer executable instructions 424 cause the processor(s) 416 to implement the containers 328, 330 and the computer executable instructions 524 cause the processor(s) 516 to implements the container 332, as shown in FIG. 7. Also, it is presumed that the container agent 328A, 330A, 332A of each of the containers 328, 330, 332 are all presumed to be members of the same project specific channel. Furthermore, it is presumed that the communication backbone 326 has determined that this project specific channel has been selected based on the information in the first data processing request. In this implementation, the communication backbone 326 publishes the first data processing request to the project specific channel and thus transmits the first data processing request to each of the server computers 402, 502. The container agents 328A, 330A, 332A are each members of the selected project specific channel.

As such, each of the container agents 328A, 330A in the server computer 402 and the container agent 332A in the server computer 502 may initially receive the first data processing request that indicates a first data type and a first storage location of a first data file (procedure 100). In this example, it is presumed that the encapsulated data processing module 332M provides a conversion for the first data type of the data processing request, while the encapsulated data processing modules 328M, 330M do not provide conversions for the first data type of the data processing request.

Since the encapsulated data processing modules 328M, 330M do not provide conversions for the first data type of the data processing request, both the container agents 328A, 330A in the server computer 402 will read and then ignore the first data processing request (procedure 101). However, since the encapsulated data processing module 332M does provide conversions for the first data type of the data processing request, the container agent 332A in the server computer 502 determines that the first data type of the first data file is supported by the encapsulated data processing module 332M based on the first data processing request (procedure 102).

In this case, the container agent 332A also determines a first communication protocol from a set of communication protocols that can be used to receive the first data file (procedure 104). For example, the container agent 332A may determine the most appropriate communication protocol from the set of available communication protocols for fetching the first data file based on the storage location of the first data file as indicated in the first data processing request. In one embodiment, the container agent 332A utilizes polyglot data transport functionality to enable data retrieval from a wide variety of data sources including but not limited to: HTTP/HTTPS, FTP, SFTP, SMB, NFS, IPFS and XMODEM/ZMODEM. This may also depend on the operational characteristics of the external computer system that is storing the first data file.

The server computer 502 may then receive the first data file from the first storage location in accordance with the first communication protocol (procedure 106). As such, the server computer 502 then provides the first data file to the container agent 332A. The communication backbone 326 may serve as an intermediary when receiving the first data file from an external data source. More specifically, the communication backbone 326 may provide an interface to the external computer system in order for the container agent 332A to receive the first data file. The container agent 332A may then perform the appropriate procedures such that the first data file is provided as an input to the encapsulated data processing module 332M.

The server computer 502 may then prepare the received first data file for execution with the encapsulated data processing module 332M (procedure 107). For example, the container agent 332A may then create a copy of the received first data file at a location within the container 332 that is accessible by the encapsulated data processing module 332M.

The server computer 502 may then execute the encapsulated data processing module 332M in the container 332 to convert the first data file in the first data format into second data in a second data format (procedure 108). The encapsulated data processing module 332M may then provide the second data to the container agent 332A. The container agent 332A may then provide a message that comprises the second data (procedure 110). More specifically, the container agent 332A may transmit the message with the second data to the communication backbone 326.

The communication backbone 326 may then receive the second data in the second data format (procedure 206). Upon receiving the second data, the communication backbone 326 may transmit the second data to an external application and/or may publish the second data in the project specific channel so that another container performs a data processing function with the second data. Additionally or alternatively, the communication backbone may publish the second data in another project specific channel based on the message. For example, the message may indicate the second data format of the second data, the storage location of the second data, and/or the computer system that stores the second data. The communication backbone 326 may publish the second data in another project specific channel selected based on this information in the message.

As shown by FIGS. 3-8, different types of computer system configurations may be utilized to implement the procedures described above with respect to FIG. 1 and FIG. 2. With the system configuration in FIG. 3, a single server computer (i.e., the server computer 302) provided both the communication backbone 326 and the containers 328, 330, 332. In contrast, the server computer 302 provided the communication backbone 326 while the server computer 402 provided a host for the containers 328, 330, 332 in FIG. 5. In FIG. 7, the server computer 302 again provided the communication backbone 326 but multiple server computers (i.e., the server computer 402 and the server computer 502) provided the hosts for the containers. The particular example described in the FIG. 5 presumed that the container 332 implemented by the server computer 502 performed the data conversion. However, if data processing request was for data files with data types for conversion by the encapsulated data processing modules 328M, 330M, it would be the server computer 402 performing the procedures described in FIG. 1 and the server computer 502 would ignore the request.

It should be noted that the configurations described in FIGS. 3, 5, and 7 are simply exemplary. First, any number of servers may be utilized to implement any number of containers, depending on the number and types of conversion needed to be performed. Furthermore, one server computer may both provide the communication backbone and host one or more containers while still having one or more server computers hosting other containers. These and other configurations would be apparent to one of ordinary skill in the art in light of this disclosure.

While much of the above referenced discussion relates to containers with encapsulated data processing modules that provide data conversions, the disclosed containerization techniques are applicable to any type of data processing module. The container agent would simply need to be tailored to the particular execution parameters of the data processing module. For example, VLS tools, computer models, machine learning networks, web applications, software design tools, and the like can be encapsulated in a container. So long as the data processing design can benefit from isolating different software components, the discussed containerization techniques may be utilized in the design.

Additional information and embodiments are provided in the attached Appendix.

Those skilled in the art will recognize improvements and modifications to the preferred embodiments of the present disclosure. All such improvements and modifications are considered within the scope of the concepts disclosed herein and the claims that follow.

What is claimed is:

1. A method, comprising:
receiving a first data processing request that indicates a first data type and a first storage location of a first data file;
determining that the first data type of the first data file is supported by an encapsulated data processing module based on the first data processing request;
determining a first communication protocol from a set of communication protocols that can be used to receive the first data file;
receiving the first data file from the first storage location in accordance with the first communication protocol;
preparing the received first data file for execution with the encapsulated data processing module;
executing the encapsulated data processing module to convert the first data file in the first data format into second data in a second data format; and
providing a message that comprises the second data.

2. The method of claim 1, further comprising:
receiving the first data processing request by a communication backbone;
determine that the first data processing request is associated with a channel; and
publishing the first data processing request on the channel.

3. The method of claim 2, wherein receiving the first data processing request that indicates the first data type and the first storage location of the first data file, comprises receiving the published first data processing request by a container agent in a container, wherein a container agent is subscribed to the channel and receives the published first data processing request through the channel.

4. The method of claim 3, wherein the container agent determines that the first data type of the first data file is supported by the encapsulated data processing module based on the first data processing request.

5. The method of claim 3, wherein the container further encapsulates the encapsulated data processing module.

6. The method of claim 2, wherein the container agent determines the first communication protocol from the set of communication protocols that can be used to receive the first data file based on the first storage location indicated by the first data processing request.

7. The method of claim 6, wherein the container agent utilizes polygot data transport functionality to enable data retrieval of the first data file.

8. The method of claim 2, wherein preparing the received first data file for execution with the encapsulated data processing module comprises creating a copy of the received first data file at a location within the container that is accessible by the encapsulated data processing module.

9. The method of claim 2, wherein providing the message that comprises the second data, comprises:
receiving, by the container agent, the second data from the encapsulated data processing module;
generate the message having the second data, wherein the message indicates a second data type of the second data; and
transmitting the message to a communication backbone.

10. The method of claim 9, further comprising:
reading the message with the communication backbone;
publishing, by the communication backbone, the message on a channel based on the second data type.

11. A method, comprising:
receiving a first data processing request that indicates a first data type and a first storage location of a first data file;
determining that the first data type of the first data file is supported by an encapsulated data processing module based on the first data processing request;
determining a project specific channel based on the first data processing request;
provide the first data processing request to the project specific channel; and
receiving second data in a second data format, wherein the first data file in the first data format has been converted into the second data in the second data format.

12. The method of claim 11, wherein determining the project specific channel is based on the first data type indicated by the first data processing request.

13. The method of claim 11, further comprising, receiving, by a container agent subscribed to the channel, the published first data processing request through the project specific channel.

14. The method of claim 13, wherein the container agent is provided within a container and the container further includes an encapsulated data processing module and wherein the method further comprises generating the second data in the second data format with the encapsulated data processing module.

15. The method of claim 13, further comprising:
receiving the first data processing request by a communication backbone;
determine that the first data processing request is associated with a channel; and
publishing the first data processing request on the project specific channel.

16. The method of claim 15, wherein the communication backbone and the container agent are implemented by a server computer.

17. The method of claim 15, wherein the communication backbone is implemented by a first server computer and the container agent is implemented by a second server computer.

18. The method of claim 16, wherein the encapsulated data processing module is implemented by the second server computer.

19. A method, comprising:
reading configuration information from a file within a concurrent execution environment;
determining from the configuration information which data type an encapsulated data management and lifecycle execution agent can process;
determining from the runtime information connection information for a data management communication system;
connecting to a data management communication system to receive data processing requests;
receiving a first data processing request that indicates a first data type and a first storage location of a first data file;
determining that the first data type of the first data file is supported by an encapsulated data processing module based on the first data processing request;
determining a first communication protocol from a set of communication protocols that can be used to receive the first data file;
receiving first data of the first data file from the first storage location in accordance with the first communication protocol;
preparing the received first data file for execution with the encapsulated data processing module;
executing the encapsulated data processing module to convert the first data in a first data format into second data in a second data format; and
providing a message that comprises the second data.

20. The method of claim 19 further comprising:
receiving the first data processing request by a communication backbone;
determining that the first data processing request is associated with a channel; and
publishing the first data processing request on the channel.

21. The method of claim 20, wherein receiving the first data processing request that indicates the first data type and the first storage location of the first data file, comprises receiving the published first data processing request by a container agent in a container, wherein a container agent is subscribed to the channel and receives the published first data processing request through the channel.

22. The method of claim 21, wherein the container agent determines that the first data type of the first data file is supported by the encapsulated data processing module based on the first data processing request.

23. The method of claim 21, wherein the container further encapsulates the encapsulated data processing module.

24. The method of claim 20, wherein the container agent determines the first communication protocol from the set of communication protocols that can be used to receive the first data file based on the first storage location indicated by the first data processing request.

25. The method of claim 24, wherein the container agent utilizes polygot data transport functionality to enable data retrieval of the first data file.

26. The method of claim 20, wherein preparing the received first data file for execution with the encapsulated data processing module comprises creating a copy of the received first data file at a location within the container that is accessible by the encapsulated data processing module.

27. The method of claim 20, wherein providing the message that comprises the second data, comprises:
receiving, by the container agent, the second data from the encapsulated data processing module;
generate the message having the second data, wherein the message indicates a second data type of the second data; and
transmitting the message to a communication backbone.

28. The method of claim 27, further comprising:
reading the message with the communication backbone;
publishing, by the communication backbone, the message on a channel based on the second data type.

* * * * *